(12) United States Patent
Link et al.

(10) Patent No.: US 8,231,147 B2
(45) Date of Patent: Jul. 31, 2012

(54) CLAMP FOR TUBULAR CONNECTIONS IN SMALL REFRIGERATION SYSTEMS

(75) Inventors: Rodrigo Link, Joinville-Sc (BR); Claudio Roberto Hille, Joinville-SC (BR)

(73) Assignee: Whirlpool S.A., São Paulo-Sp (BR)

( * ) Notice: Subject to any disclaimer, the term of this patent is extended or adjusted under 35 U.S.C. 154(b) by 120 days.

(21) Appl. No.: 12/439,262

(22) PCT Filed: Sep. 4, 2007

(86) PCT No.: PCT/BR2007/000228
§ 371 (c)(1),
(2), (4) Date: Apr. 2, 2009

(87) PCT Pub. No.: WO2008/028265
PCT Pub. Date: Mar. 13, 2008

(65) Prior Publication Data
US 2009/0265894 A1    Oct. 29, 2009

(30) Foreign Application Priority Data

Sep. 4, 2006 (BR) ..................................... 0604028

(51) Int. Cl.
*F16L 25/00* (2006.01)
(52) U.S. Cl. ....................................... 285/420; 24/16 PB
(58) Field of Classification Search ................ 285/420, 285/305; 24/16 PB, 17 AP; 248/74.3
See application file for complete search history.

(56) References Cited

U.S. PATENT DOCUMENTS

| | | | | |
|---|---|---|---|---|
| 4,386,752 A | * | 6/1983 | Pavlak et al. | 248/74.3 |
| 4,452,097 A | * | 6/1984 | Sunkel | 285/419 |
| 4,526,756 A | * | 7/1985 | Wong | 24/17 AP |
| 4,793,775 A | | 12/1988 | Peruzzi et al. | |
| 4,795,197 A | * | 1/1989 | Kaminski et al. | 285/419 |
| 5,015,013 A | * | 5/1991 | Nadin | 285/903 |
| 5,385,373 A | * | 1/1995 | Love | 24/16 PB |
| 5,474,268 A | | 12/1995 | Yu | |
| 7,178,837 B2 | * | 2/2007 | Yoshino | 285/305 |
| 7,240,930 B2 | * | 7/2007 | Stravitz | 285/420 |
| 7,300,078 B2 | * | 11/2007 | Yamamoto et al. | 285/420 |

FOREIGN PATENT DOCUMENTS

| | | |
|---|---|---|
| DE | 3708225 | 9/1988 |
| DE | 102004023867 | 11/2005 |
| DE | 202006006746 | 7/2006 |
| WO | WO-9200894 | 1/1992 |
| WO | WO-03001069 | 1/2003 |

* cited by examiner

*Primary Examiner* — David E Bochna
(74) *Attorney, Agent, or Firm* — Gifford, Krass, Sprinkle, Anderson & Citkowski, P.C.

(57) ABSTRACT

A clamp for mounting a tubular connector in a refrigeration circuit includes two semi-annular portions having end sections with each of the end sections including surfaces which extend radially outwardly from the annular portions of the clamp and a lock for locking the ends of the semi-annular portions together around the end of the tubular connector with the radially extending end surfaces of the end sections in abutting engagement.

8 Claims, 5 Drawing Sheets

CLAMP FOR TUBULAR CONNECTIONS IN SMALL REFRIGERATION SYSTEMS

This application is a US National Phase Application under 35 U.S.C. §371 of International Patent Application No. PCT/BR2007/000228 filed Sep. 4, 2007, which claims priority to and the benefit of Brazilian Patent Application No. PI0604028-4, filed Sep. 4, 2006, each of which are hereby incorporated by reference in their entireties. The International Application published as WO 2008/028265 on Mar. 13, 2008.

FIELD OF THE INVENTION

The present invention refers to a clamp construction for tubular connections in small refrigeration systems, to be utilized around a tubular connecting element, particularly around tubular connections of a refrigeration compressor that are provided inside or outside a casing thereof and, more particularly, for attaching tubular connections of an acoustic muffler of a refrigeration compressor. More specifically, the clamp of the present invention is utilized for attaching a suction acoustic muffler connector, generally in the form of a flexible component which provides a hermetic connection between the gas inlet region in the compressor casing, in which is located an inlet suction tube, and the suction chamber defined in the interior of said casing, accommodating the movements resulting from the relative vibration between said suction chamber and the wall of the compressor casing.

BACKGROUND OF THE INVENTION

The refrigeration systems essentially comprise a compressor, a condenser and an evaporator, connected to each other through tubular connections, which contain a working fluid that is defined by a refrigerant fluid pumped by the compressor, to promote heat exchange with an ambient usually associated with the evaporator of the refrigeration system.

Among the characteristics responsible for improving the performance of the refrigeration compressors are the increase of the amount of refrigerant fluid, in gas form, drawn during suction, and the reduction of the power necessary to compress this gas, requiring the gas to be under as low temperature as possible (greater specific mass). One of the ways for attaining this object is to use a direct suction system.

In some known compressor constructions for a refrigeration system, the gas suction occurs by direct suction, from an inlet suction tube 1a mounted in the casing 1 of the compressor, to the interior of a suction chamber, usually comprising a suction acoustic muffler 2 disposed in the interior of said casing 1. The suction chamber further comprises a suction orifice generally defined in a valve plate and, in some constructions, an additional suction chamber, defined in a head mounted against the valve plate, both not illustrated. In other known compressor constructions for a refrigeration system, the gas suction occurs by direct suction, but with a suction acoustic muffler 2 mounted outside the casing 1 of the compressor.

In the constructions presenting the suction acoustic muffler 2 inside the casing 1 of the compressor, the tubular connection that defines a suction line of the refrigeration system is maintained in fluid communication with said suction acoustic muffler 2 through a flexible tubular connecting element 3 that provides a hermetic connection between the gas inlet region in the interior of the casing 1 of the compressor, through the inlet suction tube 1a and the suction chamber, accommodating the movements resulting from the relative vibration between said suction chamber and the wall of the casing 1 of the compressor, directing the cold gas of the suction directly to the interior of the suction chamber, minimizing heat exchanges of this cold gas with the gas present in the interior of the casing 1.

The tubular connecting element 3 establishes a passageway for the refrigerant fluid in gas form, being attached, by one of its ends, to the outer part of a gas inlet duct of the suction chamber, usually mounted in the interior of the casing 1 of the compressor (FIG. 1) and having an opposite end seated and pressed against an adjacent inner wall portion of the casing 1, said opposite end surrounding concentrically the inlet suction tube 1a.

During the start of the compressor or during the normal operation thereof, the pressure inside the tubular connecting element 3 is lower than the pressure outside it, due to the suction effected by the movement of a piston 4, reciprocating inside a cylinder 5 of the compressor, and whose movement draws the refrigerant fluid, in gas form, to the interior of a compression chamber 5a defined inside said cylinder 5, in which is mounted the piston 4. This pressure reduction causes a contraction in the tubular connecting element 3 pulling the whole mechanical assembly of the compressor that is connected to the suction chamber against the wall of the casing 1 of the compressor. The inertia of the mechanical assembly generates a force which tends to oppose to this movement, causing the release of the tubular connecting element 3 from the suction chamber.

In a known solution, the tubular connecting element 3 is constructed in a flexible material with low thermal conductivity which can be retained to the suction acoustic muffler 2 and in sliding contact with the casing 1 of the compressor, as it occurs in the solution described in document U.S. Pat. No. 4,793,775. However, this construction presents the disadvantage, in some conditions, mainly at the start of the compressor, of conducting the tubular connecting element 3 to detach from its mounting condition to the acoustic muffler 2.

In order to guarantee the fixation of the tubular connecting element 3, by its connecting end, to the suction chamber or, more specifically, to the acoustic muffler, it is necessary to install a clamp 6, which externally and radially presses the tubular connecting element 3 against the outer surface of a tubular element 7 of the acoustic muffler 2. This clamp 6 of known construction is manufactured in steel, which generates potential problems related to the safety of the compressor, due to the possibility of this component falling inside the casing 1, causing the risk of a short circuit between the electrically powered parts and the casing 1. Besides, this known construction presents disadvantages as to the mounting of the metallic clamp 6 around the tubular connecting element 3, mainly in situations in which there is not enough space for using tools or automatic mounting devices to be applied to elements that will definitively lock the clamp in the mounted condition.

Another disadvantage of this construction refers to the manufacturing costs of said clamp 6, which by the fact of being metallic, requires cutting and mechanical shaping steps to be manufactured, as well as surface and heat treatments, which also raise the cost of its production.

OBJECTS OF THE INVENTION

It is an object of the present invention to provide a clamp for tubular connections in small refrigeration systems which allows attaching a tubular connecting element to a tubular element of the refrigeration system, in a reliable way, preventing involuntary releases.

Another object of the present invention is to provide a clamp such as cited above and which does not compromise the operational reliability of the compressor.

It is a further object of the present invention to provide a clamp of the type presented above, which is of easy construction and reduced cost.

It is also a specific object of the present invention to provide a clamp as cited above, which promotes the tight and reliable connection of a tubular connecting element of an acoustic muffler of the compressor to a tubular element of said acoustic muffler.

SUMMARY OF THE INVENTION

These and other objects of the present invention are attained with the provision of a clamp for tubular connections in small refrigeration systems of the type which comprises a compressor operatively associated with a refrigeration circuit containing at least one working fluid, said refrigeration system comprising at least one tubular connecting element, made of an elastically deformable material, to be attached around a tubular element that conducts working fluid. The present clamp comprises two semi-annular portions, each having a first end and a second end, said first ends being coupled to each other and the second end of one of said semi-annular portions being provided with a locking means to be engaged with a lock receiving means provided in the second end of the other semi-annular portion, the coupling between the two first ends being made so as to allow the two semi-annular portions to be displaced between an open position, with the second ends spaced from each other, for allowing to place the clamp around the tubular connecting element already mounted around the tubular element, and a closed position, in which the second ends are seated one against the other, with the locking means retained in the lock receiving means and in which the tubular connecting element is pressed against the tubular element.

BRIEF DESCRIPTION OF THE DRAWINGS

The invention will be described below with reference to the enclosed drawings, given by way of example of an embodiment of the invention and in which.

DESCRIPTION OF THE ILLUSTRATED EMBODIMENT

Figure 1:
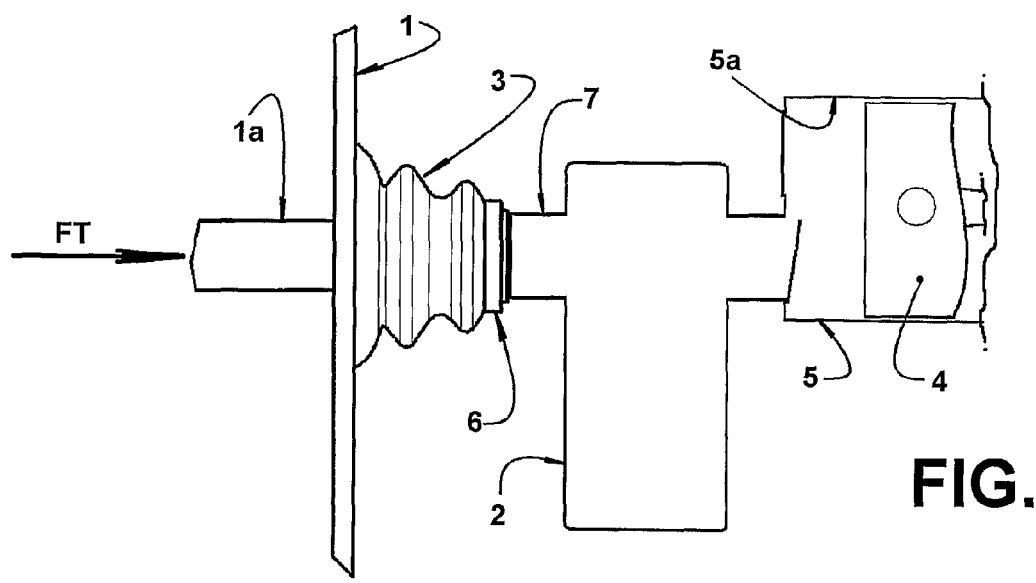
FIG. 1 represents, schematically and in a lateral view, part of a compressor casing where is provided an inlet suction tube communicating a suction line portion of a refrigeration system with the interior of a prior art acoustic muffler.

Although the concept described herein is applied to any tubular connections in small refrigeration systems of the type which comprises a compressor operatively associated with a refrigeration circuit containing at least one working fluid FT, the description below will use, as an example, the tubular connections of an acoustic muffler in a refrigeration compressor. It should be understood that this does not imply any restriction to the applicability of the present invention. The same can be said in relation to the embodiment presented in the drawings; what is intended to protect is the principle and not the specific application or constructive form.

According to the present invention, the refrigeration system comprises at least one tubular connecting element 10, made of an elastically deformable material, to be attached around a tubular element 20 that conducts a working fluid FT, such as, for example, a refrigerant fluid, through a clamp 30 which comprises two semi-annular portions 31, each having a first end 32 and a second end 33, said first ends 32 being coupled to one another and the second end 33 of one of said semi-annular portions 31 being provided with a locking means 40 to be engaged to a lock receiving means 50 provided in the second end 33 of the other semi-annular portion 31, the coupling between the two first ends 32 being made so as to permit said two semi-annular portions 31 to be displaced between an open position, with the second ends 33 spaced from each other to allow placing the clamp 30 around the tubular connecting element 10 already mounted around the tubular element 20 and a closed position, in which the second ends 32 are seated against each other, with the locking means 40 retained in the lock receiving means 50, and in which the tubular connecting element 10 is pressed against the tubular element 20.

It should be understood that the clamp 30 of the present invention can be also applied for attaching tubular connections conducting working fluid FT other than the refrigerant fluid, but which are also present in the refrigeration system, particularly in the interior of the compressor.

Figure 6:
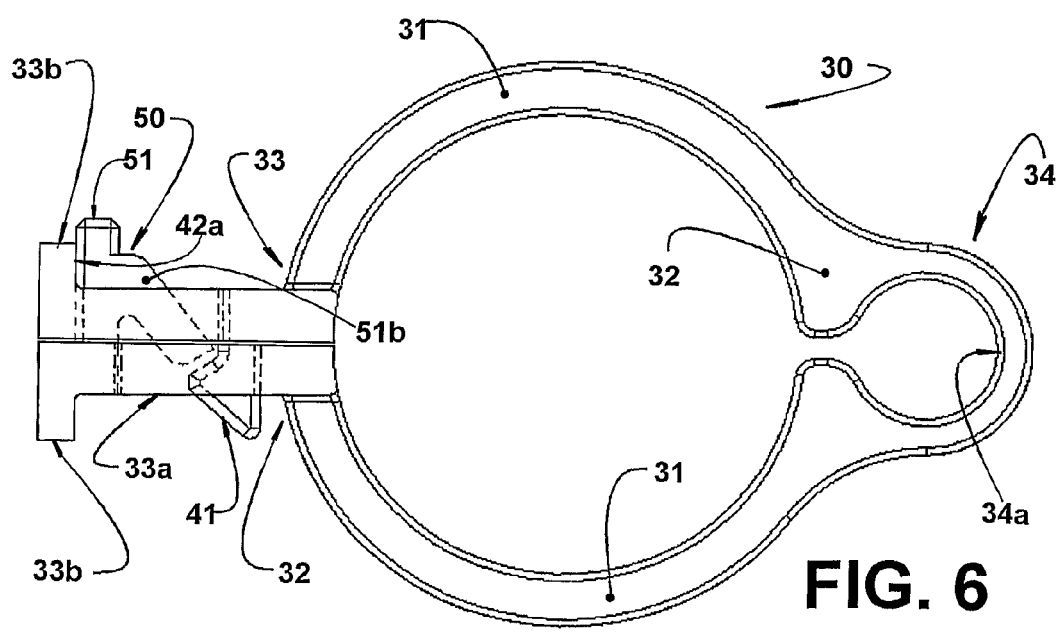
FIG. 6 schematically represents a front view of the clamp of the present invention in its closed position.
Figure 7:
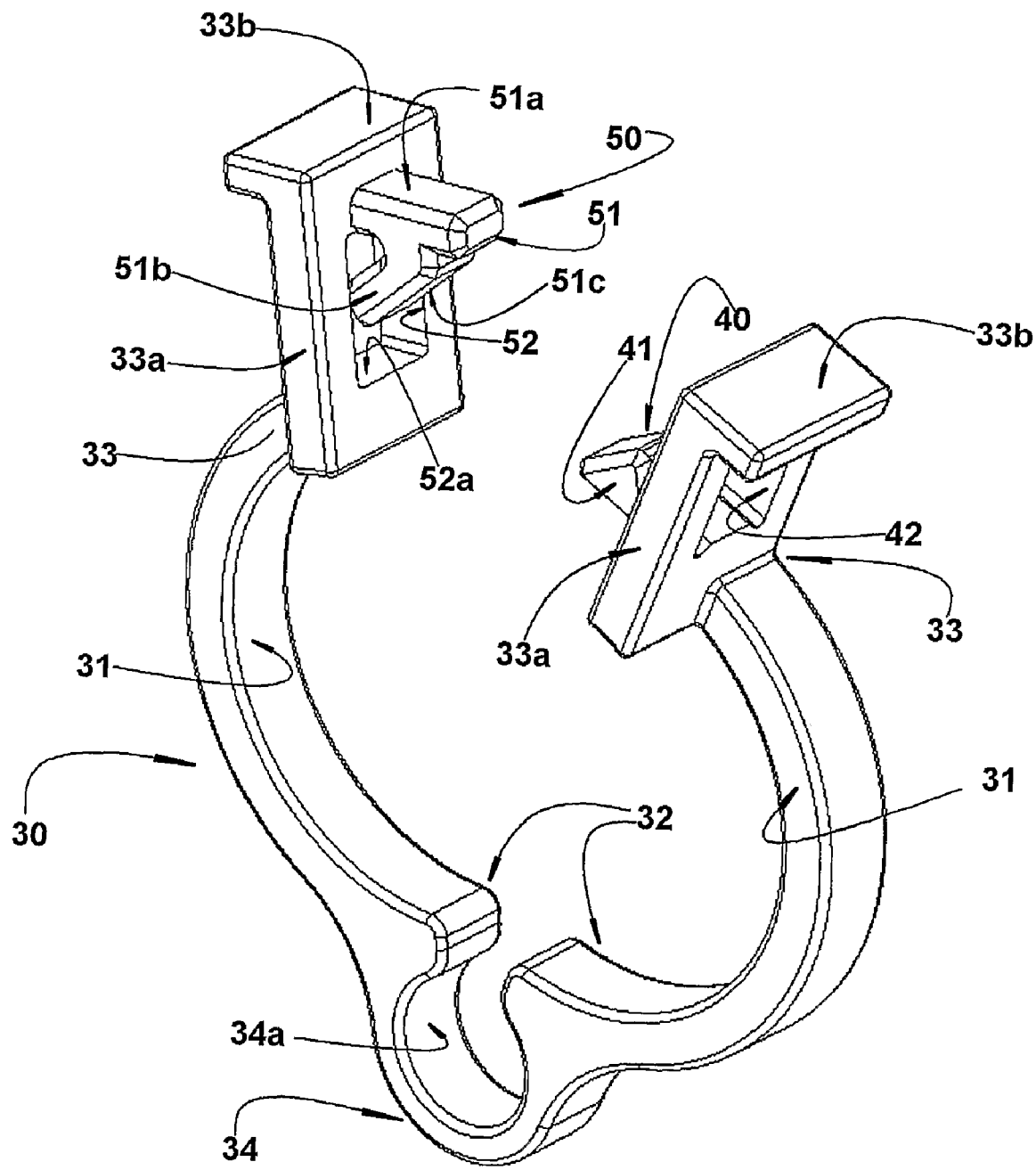
FIG. 7 schematically represents a perspective view of the clamp of the present invention in its open position and as illustrated in FIG. 5.
Figure 8:
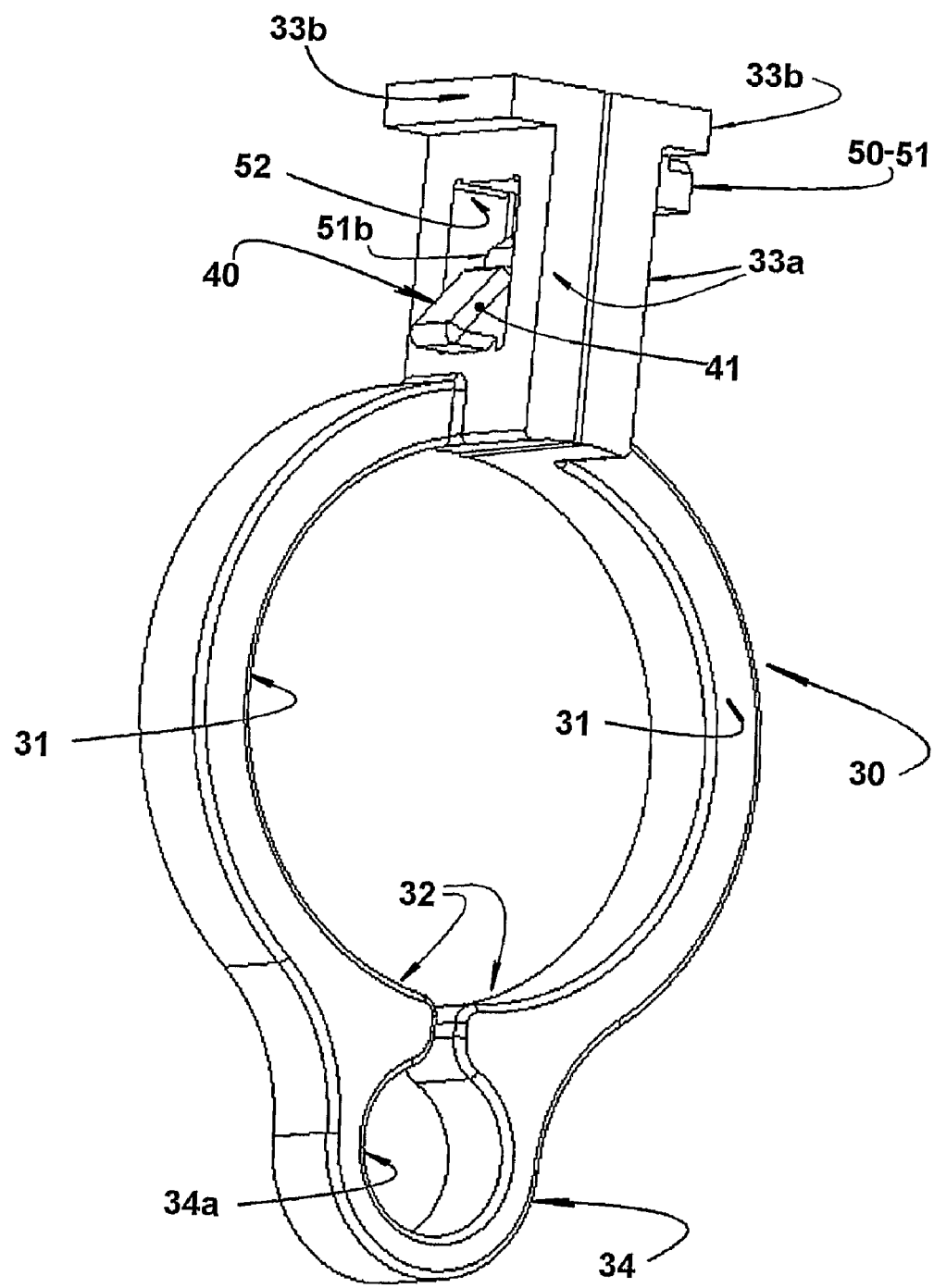
FIG. 8 schematically represents a perspective view of the clamp of the present invention in its closed position and as illustrated in FIG. 6.

According to a way of carrying out the present invention, in order to obtain the closed position of the clamp 30, the locking means 40 is elastically deformed to fit in the lock receiving means 50 upon the mutual seating of the second ends 33 of the semi-annular portions 31, said locking means 40 being, for example, definitively retained in the lock receiving means 50 in said closed position of the two semi-annular portions 31 (FIGS. 6 and 8).

According to a way of carrying out of the present invention, the locking means 40 comprises at least one tooth 41 to be engaged in the lock receiving means 50, which comprises, for example, a projection 51 having a ramp portion 51c against which the tooth 41 of the locking means is actuating, during the operation for obtaining the closed condition of the present clamp.

In a way of carrying out of the present invention, not illustrated, the locking means comprises a projection, for example, in the form of a tooth, to be introduced through a window of the lock receiving means, engaging to an adjacent edge thereof.

In the illustrated constructive form, the locking means 40 and the lock receiving means 50 further present a respective window 42, 52, to facilitate the introduction and the coupling of the parts of tooth 41 and projection 51, respectively of the locking means 40 and of the lock receiving means 50.

In a way of carrying out the present invention, the two first ends 32 of the two semi-annular portions 31 of the clamp 30 are coupled to each other, in a single piece, by a coupling portion 34 that is elastically deformable to permit the relative angular movement of the two semi-annular portions 31 between their open and closed positions.

The clamp 30 of the present invention comprises an outer surface made of polymeric material, which guarantees its low electrical conductivity. In a particular form of the present invention, the clamp 30 is provided in polymeric material, being produced by injection in plastic material.

The coupling portion 34 is defined, for example, by an arched projection uniting the first ends 32 of the semi-annular portions 31, whose contour allows said coupling portion 34 to constantly force the semi-annular portions 31 to their closed position. In the illustrated constructive form, the coupling portion 34 is defined by an arched radial projection 34*a*.

According to the illustrations, the two semi-annular portions 31 define a circular contour to the clamp 30, said two semi-annular portions 31 being, for example, symmetrical in relation to a diametral axis of the clamp 30, for example, an axis passing through the coupling portion 34.

Figure 2:
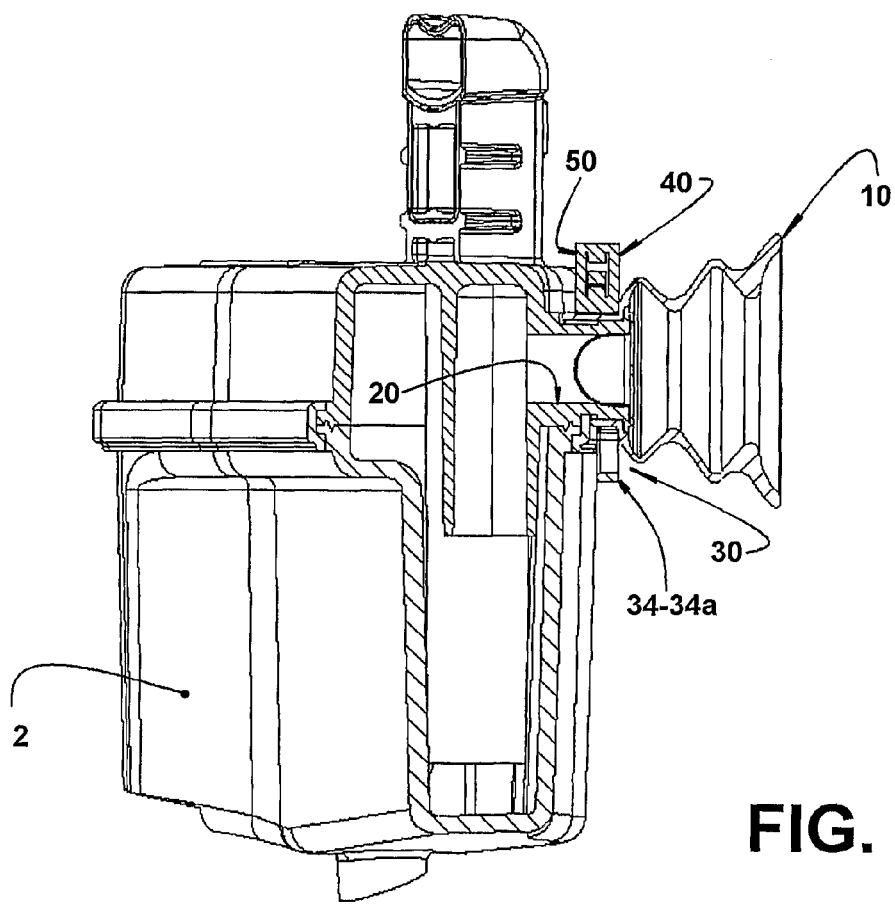
FIG. 2 represents, schematically and in a partial longitudinal section, an acoustic muffler having a tubular connecting element attached to its tubular element through a clamp constructed according to the present invention.
Figure 3:
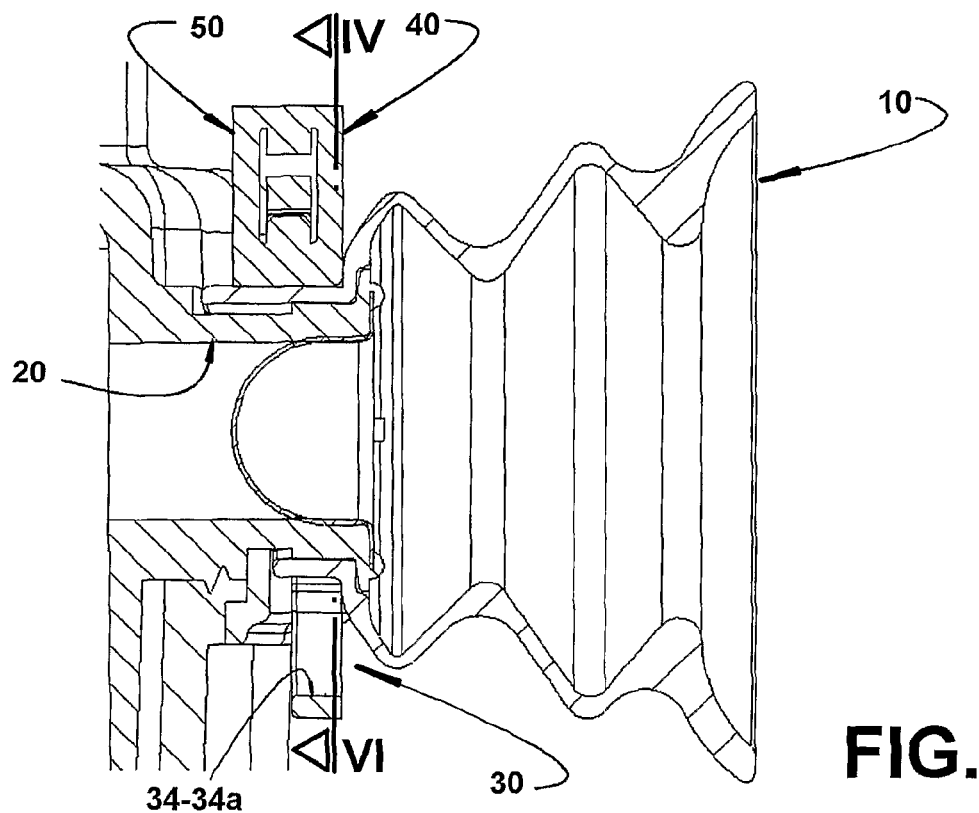
FIG. 3 represents, schematically and in an enlarged view, the region where the clamp is mounted to the tubular connecting element of FIG. 2.
Figure 4:
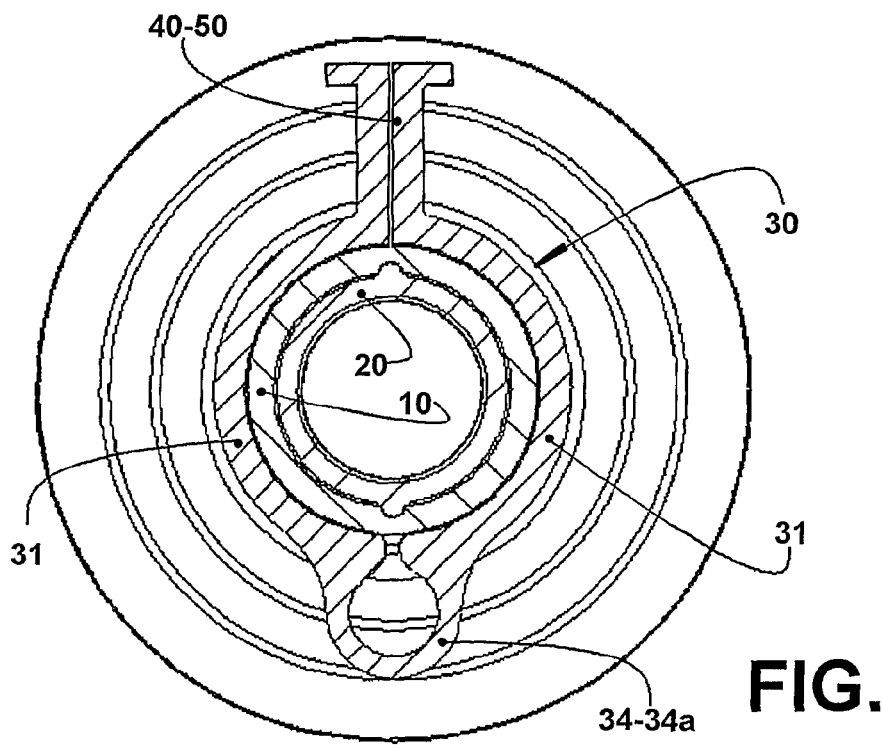
FIG. 4 represents, schematically and in a longitudinal section, according to line IV-IV in FIG. 3, the clamp of the present invention mounted to the tubular connecting element and tubular element of the acoustic muffler.
Figure 5:
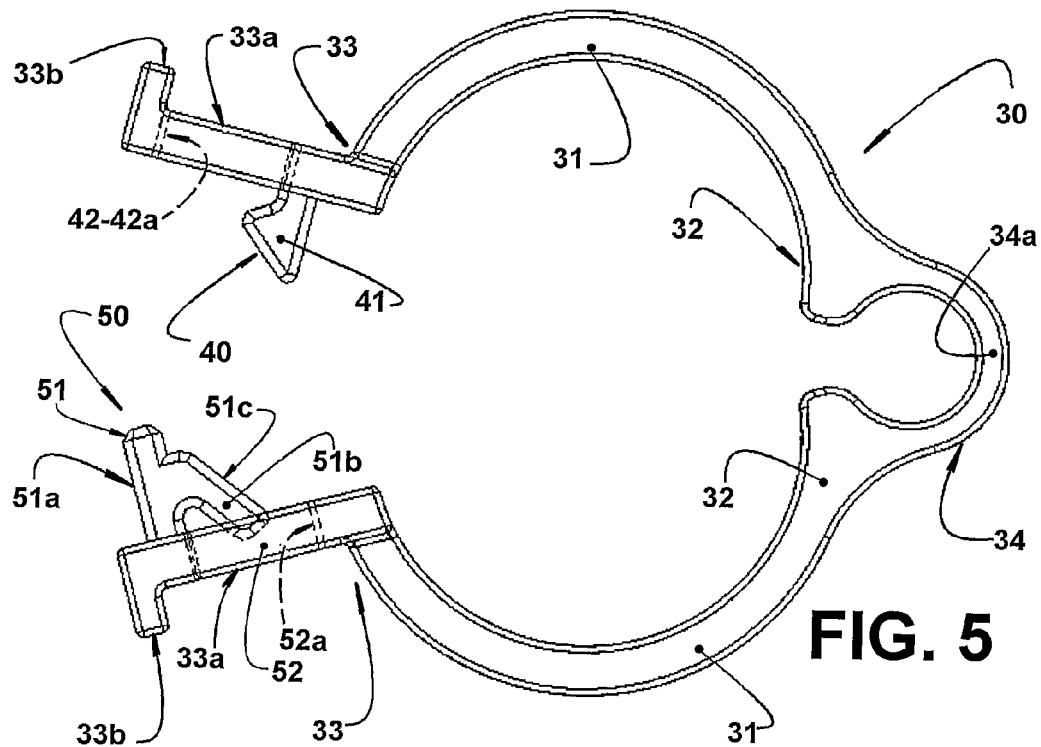
FIG. 5 schematically represents a front view of the clamp of the present invention in its open position.

The mounting of the clamp of the present invention to the tubular connections will be described considering the tubular connections for an acoustic muffler 2 of the type utilized in the suction line of a refrigeration compressor, as illustrated in the enclosed drawings. According to the drawings illustrated in FIGS. 2-4, the clamp 30 of the present invention is conducted, in its open position, to surround a usually flexible tubular connecting element 10 provided around a usually more rigid tubular element and which defines an inlet nozzle of the acoustic muffler 2, which, in the illustrated example, is a suction acoustic muffler. For this mounting arrangement, the first and second ends 32, 33 of each semi-annular portion 31 are conducted to a mutual spacing, until each said semi-annular portion 31 is seated against an adjacent outer surface portion of the tubular connecting element 10, in the fixation region thereof around the tubular element 20. For a better fixation of the clamp 30 to said tubular connections, the inner diameter defined by the semi-annular portions 31, in the closed position of said clamp 30, must be at most equal to the outer diameter of the tubular connecting element 20 around which said clamp 30 is mounted, so that, in the closed position, said clamp 30 exerts a radial compression of said tubular connecting element 10 against the tubular element 20.

After mounting the clamp around the tubular connecting element 10, the coupling portion 34 forces the semi-annular portions 31 to approximate, in order to conduct the clamp 30 to its closed position. In this condition, the locking means 40 is coupled to the lock receiving means 50, for example, by fitting the tooth 41 of said locking means 40 into the projection 51 of the lock receiving means 50, forcing the first ends 32 of the semi-annular portions 31 to a mutual seating.

In the illustrated construction, each second end 33 comprises a projecting portion 33*a* radially extending outwardly from the contour of the respective semi-annular portion 31 and presenting, in a free end, a respective lateral flange 33*b*. In the closed position of the clamp 30 of the present invention, the projecting portion 33*a* of each semi-annular portion 31 has a respective confronting face seated against the confronting face of the other projecting portion 33*a*. Each projecting portion 33*a* presents a width and a thickness calculated so as to reinforce the locking region of the clamp, preventing breaks in the fixation region between the locking means 40 and the lock receiving means 50. In the illustrated construction, each projecting portion 33*a* presents a width superior to the width of a corresponding semi-annular portion 31, for example, by a value between 1.5 and 2 times the width of said semi-annular portion 31.

The projection 51 of the lock receiving means 50 comprises a base 51*a*, orthogonally projecting from the confronting face of the respective projecting portion 33*a* towards the projecting portion 33*a* of the other semi-annular portion carrying the locking means 40, said base 51*a* having an upper face disposed substantially parallel to an adjacent upper edge 42*a* of the window 42 defined in the other projecting portion 33*a* carrying the locking means 40, in order to remain seated against this upper edge 42*a*, in the closed position of the present clamp.

The projection 51 comprises a tongue 51*b*, angularly projecting from the base 51*a*, so as to have a ramp face facing the tooth 41 of the locking means 40, an end of said tongue 51*b* spaced from an adjacent lower edge 52*a* of the window 52 being provided in the respective semi-annular portion 31, to allow introducing the tooth 41 of the locking means 40, upon the mounting the clamp of the present invention, around a tubular connecting element.

In the illustrated construction, each of the parts of tooth 41 and projection 51, respectively of the locking means 40 and of the lock receiving means 50 presents a respective ramp portion, said ramp portions mutually actuating when the clamp is conducted to the closed position, provoking the elastic deformation of said parts, until both are mutually engaged.

The clamp 30 of the present invention has, as advantages, the elimination of risks with short circuit, in case the clamp 30 falls in the interior of the casing 1 of the compressor, since its material is a bad electricity conductor, providing more safety to the user, in case said clamp 30 presents a defect and detaches from its mounting position.

Another advantage of the present solution refers to the easy handling and application of the present clamp 30, not only by the fact of said clamp being obtained in a flexible material, such as polymeric material, which has more flexibility in relation to the steel of the usual constructions, but also regarding the construction of the coupling portion of said clamp 30. This flexibility allows the clamp 30 to be handled and applied more easily in situations in which there is no much space to use tools or automatic mounting devices.

A further advantage refers to the reduced cost for obtaining the clamp 30 of the present invention, since the manufacture of said clamp 30 is made in a single step, by injection, without requiring shaping or welding processes, with or without the use of heat, or applications through a thermo-shrinkable process.

What is claimed:

1. A clamp for a tubular connecting element in small refrigeration systems having a compressor operatively associated with a refrigeration circuit containing at least one working fluid, said clamp comprising:

a first and a second semi-annular portion each having a first end and a second end, said first ends being joined to each other in a single piece by a joining portion and each of said second ends and, the joining portion between the two first ends being made so as to allow said two semi-annular portions to be displaced between an open position, with the second ends spaced from each other, allowing the clamp to be placed around the tubular connecting element, and a closed position, said first and second semi-annular portions each comprising a reinforced projecting portion radially extending outwardly from a contour of the respective semi-annular portion and defining a confronting face with the confronting face of each projecting portion extending the entire length of the projecting portion, said confronting faces of the projecting portions of the second ends being seated one against the other throughout their entire length when said clamp is in the closed position, a lock carried by the second end of the first semi-annular portion and extending through an opening provided in the second end of the of the second semi-annular portion to be engaged by a locking projection extending into the opening to lock the semi-annular ends together, each projecting portion having a width and a thickness calculated so as to reinforce a locking region of the clamp to prevent breaks in the region of the projecting portions adjacent the lock, said joining portion having a contour to urge the clamp to its closed position in which each projecting portion has a respective confronting face seated against the confronting face of the other projecting portion;

the two first ends being coupled to each other, in a single piece, by an elastically deformable joining portion, to allow relative angular movement of the two semi-annular portions between their open and closed positions; and the joining portion is defined by an arched projection of the first ends of the semi-annular portions.

2. The clamp, as set forth in claim 1, wherein the joining portion is defined by an outer radial projection.

3. The clamp, as set forth in claim 1, wherein the locking projection is elastically deformed, upon the mutual seating of said second ends.

4. The clamp, as set forth in claim 3, wherein the lock is definitively retained in the lock receiving opening, in the closed position of the two semi-annular portions.

5. The clamp, as set forth in claim 3, wherein the lock comprises a tooth to be engaged by the projection formed in said lock receiving opening of the lock receiving opening.

6. The clamp, as set forth in claim 1, wherein the two semi-annular portions define a circular contour when in the closed position.

7. The clamp, as set forth in claim 6, wherein the two semi-annular portions are symmetrical in relation to a diametral axis of the clamp.

8. The clamp, as set forth in claim 1, wherein said clamp is formed, in a single piece, of polymeric material.

* * * * *

UNITED STATES PATENT AND TRADEMARK OFFICE
CERTIFICATE OF CORRECTION

PATENT NO. : 8,231,147 B2
APPLICATION NO. : 12/439262
DATED : July 31, 2012
INVENTOR(S) : Rodrigo Link et al.

Page 1 of 1

It is certified that error appears in the above-identified patent and that said Letters Patent is hereby corrected as shown below:

Claim 5:

Column 8, line 13, Delete "of the lock receiving opening",

Signed and Sealed this
Fifth Day of March, 2013

Teresa Stanek Rea
*Acting Director of the United States Patent and Trademark Office*